Patented June 24, 1952

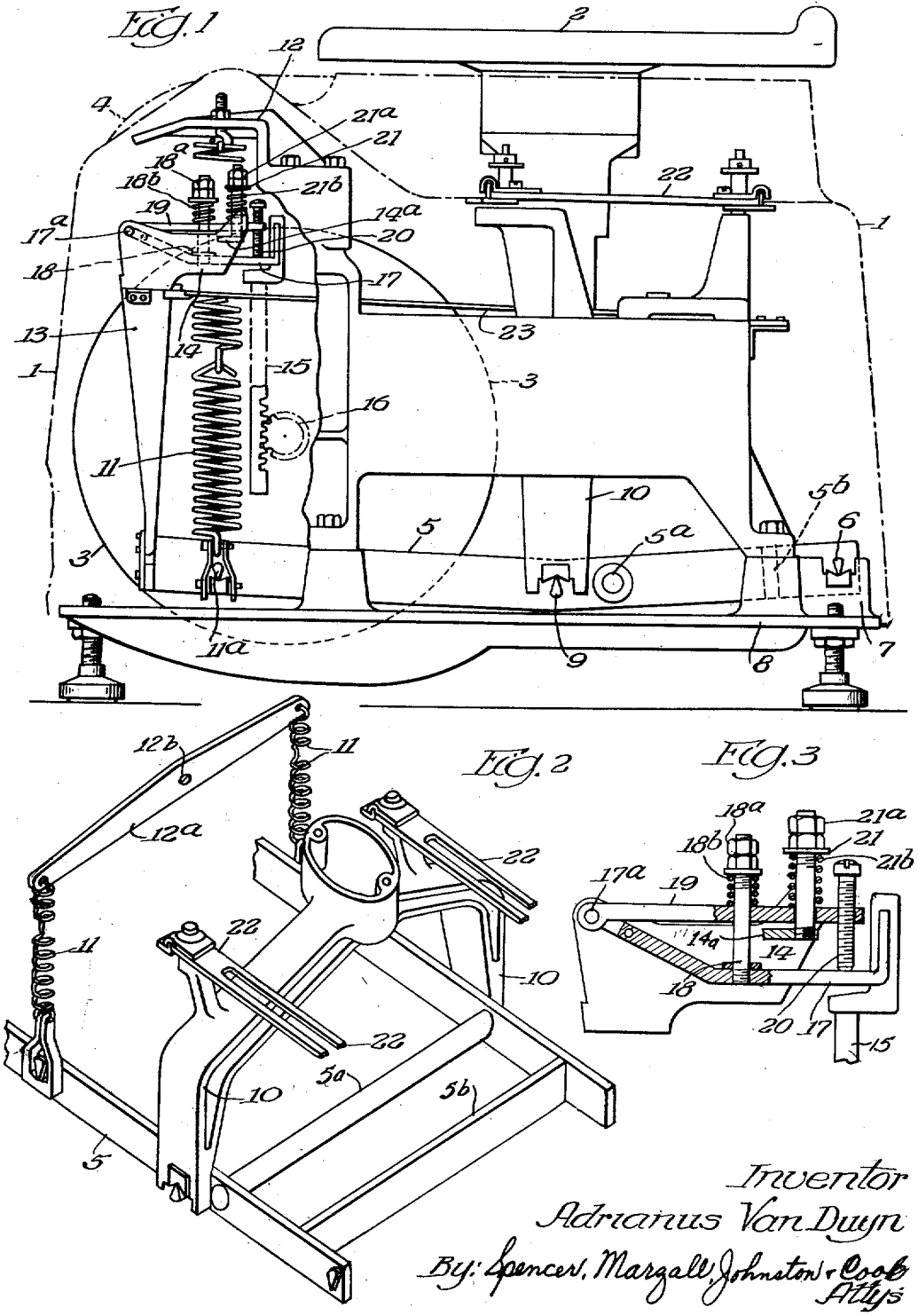

2,601,648

UNITED STATES PATENT OFFICE 2,601,648

WEIGHING APPARATUS

Adrianus van Duyn, Hillegersberg, Rotterdam, Netherlands, assignor to U. S. Slicing Machine Company, Inc., a corporation of Indiana Application August 2, 1947, Serial No. 765,667
In Great Britain August 29, 1939

6 Claims. (Cl. 265—68)

This invention relates to weighing apparatus (by which is meant apparatus adapted to effect measurements by weighing operations) having automatic load counterbalancing means, whether constituted by springs or otherwise, and having the weight-indicating element driven by a rack which is associated with shock absorbing means adapted to damp the movement of the load-influenced mechanism when a load is suddenly applied, and also when a load is suddenly removed.

In accordance with the invention, a weighing apparatus of the form stated is provided, wherein the shock absorbing means comprises a pair of members pivotally mounted on a load-influenced support, one of which members carries the rack, said members, due to the inertia of the rack-driven parts, pivoting together relatively to the support against the action of resilient means for one direction of movement of the rack, and pivoting relatively to one another against the action of resilient means for the other direction of movement of the rack, thereby effecting shock absorbing in each direction of movement of the rack.

Further according to the invention, said shock absorbing means may comprise a pair of arms pivotally mounted on a load-influenced support, one of which arms carries the rack and can be rotated in opposite directions relatively to the support by opposite forces acting longitudinally of the rack, and the other of which upon movement of the first arm in one direction is moved thereby and in unison therewith relatively to the support through a unidirectional coupling, but is prevented from following said first arm in the other direction of its relative movement by engaging an abutment on the load-influenced support; there being also a spring urging said second arm against its abutment, said spring thus resisting the movement in unison of the arms, and a further spring acting between said arms to resist movement of said rack-carrying arm alone when the second arm engages its abutment.

According to a further feature of the invention, there is provided a weighing apparatus of the type employing a rotary drum chart and having a commodity receiver supported above the drum by a weighing beam whose swinging end extends beneath and beyond the axis of the drum, wherein the drum is rotated by a rack associated with shock absorbing means adapted to damp the movement of the load-influenced mechanism when a load is suddenly applied, and also when a load is suddenly removed, for example shock absorbing means as above defined; wherein the rack is mounted on the beam by means of a supporting member whose point of connection to the beam is not disposed directly in the transverse plane of said rack, but is more remote from the fulcrum of the beam than is said plane, the mounting permitting the rack to undergo a movement corresponding to the radius of said point of connection, instead of to its smaller actual radius from the beam fulcrum.

In further accordance with the invention, there is provided an automatic weighing apparatus in which, the apparatus being of the type employing a rotary drum chart having spring counterbalancing means and a commodity receiver mounted above the drum, the main weighing beam is stirrup shaped, and has its side limbs pivotally connected intermediate their ends to a single yoke having two legs and carrying the commodity receiver, the drum chart being disposed transversely between the swinging ends of said limbs, and the pivotal axis of said beam being provided by fulcrums at the ends of said limbs remote from the drum chart; said limbs further being connected at their swinging ends each to the lower end of a corresponding upwardly extending coil spring anchored at its upper end and a rack for operation of the drum being mounted on the beam in the manner defined in the foregoing paragraphs.

References herein to a stirrup shaped weighing beam are intended to mean a beam having side members which are rigidly spaced to form an open frame capable of embracing or enclosing any parts between the side members.

In order that the invention may be clearly understood and readily carried into effect, reference will now be made to the examples of construction illustrated in the accompanying drawing, in which:

Figure 1 is a side elevation illustrating the application of the invention to a weighing scale of the rotary drum chart type, having the commodity receiver mounted above the drum and employing spring counterbalancing means.

Figure 2 is a diagrammatic perspective view illustrating suitable forms of the main weighing beam and support for the commodity receiver, and also a modified form of anchorage for counterbalancing springs.

Figure 3 is an enlarged detail sectional view of a portion of the shock absorbing means.

Referring to the drawing, the weighing scale comprises a relatively shallow box-like casing 1 (indicated in dotted lines), which is surmounted by a commodity receiver 2 and has located therein towards the front thereof a rotatable drum chart 3, a window 4 for observation of the chart being provided in an upper part of the casing.

The beam of the weighing scale is stirrup shaped in plan view (see especially Figure 2), and has parallel limbs 5 which extend along the sides of the casing 1, and are rigidly connected by bars 5a (in full lines, Figure 2) or by a transverse limb 5b along the rear of the casing. At their rear ends, the parallel limbs are fulcrumed by knife edges 6 on bearings 7 upstanding from the base 8 of the casing, and at points intermediate of their ends the said limbs are pivotally connected by knife edges 9 to a pair of downwardly extending brackets or legs 10, constituted by a single yoke which carries the commodity receiver 2 at its upper end. Near their forward ends, the limbs of the beam 5 are connected by knife edges 11a to the lower ends of corresponding coil tension springs 11, one to each limb, the upper ends of which springs are connected (in Figure 1) to a fixed part 12 of the structure. The coil tension springs 11 are uprightly disposed and located at opposite axial ends of the drum chart 3, so that the latter lies between the springs and also between the parallel arms of the beam. Alternatively, as illustrated in Figure 2, the said tension springs 11 may be connected at their upper ends to opposite ends of a compensating lever 12a, pivoted at 12b. One (or, if desired, each) of the parallel arms of the beam 5 carries at its end an upright bracket 13, the upper end 14 of which extends approximately horizontally towards the rear of the scale. The drum 3 is driven by means of a rack 15 engaging a pinion 16 on the drum spindle, and the said rack is hung pivotally from the free end of an arm 17 which is pivoted at 17a on the upper end of the upright bracket 13, mounted flexibly at its lower end on the beam, by means of a thin leaf spring. The free end of the arm 17, on which the rack is supported, extends approximately horizontally towards the rear of the scale. The pivoted rack-carrying arm 17 is provided with an upstanding pin 18 which passes freely through a further arm 19 pivoted co-axially with the rack-carrying arm 17. Said arm 19 has an adjustable threaded pin 20 forming a distance piece limiting the approach of the two arms 17, 19, one to the other. Said pin 20 also constitutes a unidirectional coupling which transmits motion from the rack-carrying arm 17 to the arm 19 only in the upward direction. The bracket 14 is also provided with a lug 14a, on which is fixed an upstanding pin 21 extending freely through the said pivoted arm 19. Each of the two pins 18, 21, carries an abutment 18a, 21a, respectively, for a compression spring (18b, 21b, respectively), which acts between its abutment and the pivoted arm 19. The spring 18b urges the two arms 17, 19, towards one another, and the spring 21b urges the arm 19 downwardly to a position determined by the lug 14a, which supports the arm 19 in its lowest position. In the event of a sudden release of load from the commodity receiver 2, the inertia of the drum 3 causes the arm 17 to rotate downwardly relative to bracket 13 which moves upwardly, and the spring 18b yields in order to absorb the shock of the sudden release, the arm 19 remaining supported by the lug 14a. On the other hand, if a load is suddenly applied to the receiver 2, the inertia of the drum results in upward pivoting of the arm 17 and, through the pin 20, of the arm 19 relative to bracket 13 which moves downwardly. Thereby, the other spring 21b is compressed to absorb the shock, the spring 18b remaining uncompressed.

By means of the above described construction, an extremely simple and robust shock-absorbing arrangement is obtained, by which the movement of the weighing mechanism is damped during both sudden loading and unloading.

The bracket 13 is constrained by a link 23 to undergo a parallel motion during oscillation of the beam 5. Accordingly, although the plane of the rack 15 is substantially nearer to the fulcrum 6 than is the free end of the beam, the extent of movement of the rack is equal to that of the end of the beam. Consequently, for a given beam ratio, a given beam deflection, and a given stroke of the rack, the drum 3 can be brought nearer to the fulcrum of the beam than if the plane of the rack passed through the extreme end of the beam, thereby providing a more compact construction.

The pivoted spring-anchoring beam 12a, in an apparatus of the kind described, having counterbalancing springs located at spaced positions on either side of the central vertical plane of the commodity receiver, is useful in that if the commodity tends to stress one spring more than another, the interconnection between the springs compensates for this tendency by transferring a portion of the stress to said other spring.

The usual check rods 22 for insuring parallelism of the scale plate may be provided.

An advantage of the construction described in the foregoing is that the weight, and therefore the intertia effect, of the "cushioned" parts is very small. Moreover, the employment of pivoted members in the shock absorbing device enables a high degree of accuracy to be obtained in the definition of the inoperative position of the shock absorbing parts, which is most important for accurate operation of the weighing scale. Further, the incorporation of the shock absorbing device between the beam and the rack enables the rack and pinion to be protected against sudden shocks.

While the preferred form of the invention has been herein shown and described, it is to be understood that various changes may be made in the details of construction, and in the combination and arrangement of the several parts, within the scope of the claims, without departing from the spirit of this invention.

What is claimed as new is:

1. Weighing apparatus embodying a rotatable drum chart, means for rotating said drum, said means embodying a gear and rack mechanism, shock absorbing means embodying a pair of arms pivotally mounted on a load-influenced support, one of said arms carrying said rack and adapted to be rotated in opposite directions relative to the support by opposite forces acting longitudinally of the rack, means whereby the other of said arms will, upon movement of the first arm in one direction, be moved thereby and in unison therewith, relatively to said support through a unidirectional coupling, but is prevented from following said first arm in the other direction of its relative movement, by engaging an abutment on the load-influenced support, a spring operating to urge the second arm against its abutment, said spring thus resisting the movement in unison of the arms, and an additional spring acting between said arms to resist movement of said rack-carrying arm alone, when the second arm engages its abutment.

2. A weighing apparatus embodying a rotatable drum chart, a commodity support, gear and rack mechanism for rotating the drum, shock absorbing means embodying a pair of members pivotally mounted upon a load-influenced support, said rack being carried by one of said members, said members due to the inertia of the rack driven parts pivoting together relatively to the support against the action of resilient means for one direction of movement of the rack, and pivoting relatively to one another against the action of resilient means for the other direction of movement of the rack, thereby effecting shock absorbing in each direction of movement of the rack, the shock absorbing means embodying a pair of arms co-axially pivoted on the load-influenced support and having their closeness of approach limited by an adjustable stop mounted on the one and co-operating with the other to constitute a undirectional coupling, said arms being urged to their mutually approached position by a spring acting between them, and the non-rack-carrying arm being normally held by a further spring against an abutment on said support, which permits movement of the said arm from its normal position only in the direction of motion transmitted by said coupling.

3. Weighing apparatus embodying a rotatable drum chart and having a commodity receiver supported above the drum by a weighing beam, whose swinging end extends beneath and beyond the axis of the drum, wherein the drum is rotated by a rack associated with shock absorbing means adapted to damp the movement of the load-influenced mechanism when a load is suddenly applied, and also when a load is suddenly removed, said shock absorbing means embodying a pair of members, one of which members carries a rack, said members due to the inertia of the rack driven parts, pivoting together relatively to the support against the action of resilient means for one direction of movement of the rack, and pivoting relatively to one another against the action of resilient means for the other direction of movement of the rack, thereby effecting shock absorbing in each direction of movement of the rack, said rack being connected to the beam by a supporting member whose point of connection to the beam is disposed on the opposite side of the transverse plane of said rack from the fulcrum of the beam, the mounting permitting the rack to undergo a movement corresponding to the radius of said point of connection, instead of to its smaller actual radius from the beam fulcrum.

4. Weighing apparatus embodying a rotatable drum chart and having a commodity receiver supported above the drum by a weighing beam, whose swinging end extends beneath and beyond the axis of the drum, wherein the drum is rotated by a rack associated with shock absorbing means adapted to damp the movement of the load-influenced mechanism when a load is suddenly applied, and also when a load is suddenly removed, said shock absorbing means embodying a pair of members, one of which members carries a rack, individual resilient means operatively associated with each of said members, said members due to the inertia of the rack driven parts, pivoting together relatively to the support against the action of one of said resilient means for one direction of movement of the rack, and pivoting relatively to one another against the action of the other of said resilient means for the other direction of movement of the rack, thereby effecting shock absorbing in each direction of movement of the rack, said rack being connected to the beam by a supporting member whose point of connection to the beam is disposed on the opposite side of the transverse plane of said rack from the fulcrum of the beam than is said plane, the mounting permitting the rack to undergo a movement corresponding to the radius of said point of connection, instead of to its smaller actual radius from the beam fulcrum, means pivotally mounting the shock absorbing members at the upper end of said supporting member, means flexibly connecting the other end of said supporting member to the beam at a point remote from the beam fulcrum, means guiding said supporting member whereby to provide substantially parallel motion during movement of the beam, said pivoted members having effective radius arms extending towards the beam fulcrum, and the rack being supported in an upright position on one of said arms, the plane of the rack thereby being between said supporting member and the fulcrum, but undergoing movement corresponding to that of the supporting member.

5. A weighing apparatus embodying a rotary drum chart, a commodity receiver above the drum, a main weighing beam of substantially stirrup formation, means pivotally connecting the side members of said stirrup to the ends of a commodity-carrying yoke, said yoke provided with two legs, said drum chart being disposed transversely between the swinging ends of said side members, the pivotal axis of said beam being provided by fulcrums at the ends of said side members remote from the drum chart, the swinging ends of said side members being connected to the lower end of a corresponding upwardly extending spring coil, means anchoring the spring at its upper end, a rack for operating said drum, and means mounting the rack upon said beam, the said spring means being disposed at spaced positions on either side of the central vertical plane extending longitudinally of said stirrup through the commodity receiver, a double-armed lever mechanism mounted upon a fixed part of the machine, said springs being connected to opposed arms of the lever, the pivot of said lever being intermediate the ends thereof and disposed in the vertical plane of the said commodity receiver.

6. A weighing apparatus embodying a rotary drum chart, a main weighing beam below the axis of the drum, means embodying a rack and pinion for rotating the drum, a bracket carried by the said beam, a pair of arms pivotally connected to and supported by said bracket, said rack being carried by one of said arms, a pair of upstanding pins, one of which is carried by the bracket and the other by the rack-carrying arm, both of said pins passing loosely through the non-rack-carrying arm, springs encompassing the pins and stressed against the non-rack-carrying arm, and an adjustable stop carried by one of the arms and engageable with the other arm to limit the movement of the arms in a direction towards each other, whereby shock absorbing will be effected in each direction of movement of the rack.

ADRIANUS van DUYN.

REFERENCES CITED

The following references are of record in the file of this patent:

UNITED STATES PATENTS

| Number | Name | Date |
|---|---|---|
| 1,460,087 | Weber | June 26, 1923 |
| 2,117,847 | King | May 17, 1938 |
| 2,167,872 | Bristol | Aug. 1, 1939 |
| 2,242,949 | Hansen | May 20, 1941 |